US005827548A

United States Patent [19]
Lavallee et al.

[11] Patent Number: 5,827,548
[45] Date of Patent: Oct. 27, 1998

[54] GOLF BALL INJECTION MOLD

[75] Inventors: Gerald A. Lavallee, Belchertown, Mass.; Douglas L. Miller, Seminole, Fla.

[73] Assignee: Lisco, Inc., Tampa, Fla.

[21] Appl. No.: 783,162

[22] Filed: Jan. 14, 1997

[51] Int. Cl.⁶ ...................................................... B29C 45/14
[52] U.S. Cl. ........................ 425/116; 264/275; 425/117; 425/139; 425/165; 425/552; 425/556; 425/577
[58] Field of Search ...................................... 425/552, 556, 425/139, 165, 116, 127, 129.1, 117, 577; 264/275

[56] References Cited

U.S. PATENT DOCUMENTS

| | | |
|---|---|---|
| 4,620,958 | 11/1986 | Wiechard ................................. 425/552 |
| 4,622,001 | 11/1986 | Bright et al. ............................. 425/552 |
| 4,959,000 | 9/1990 | Giza . |
| 5,112,556 | 5/1992 | Miller . |
| 5,122,046 | 6/1992 | Lavallee et al. . |
| 5,147,657 | 9/1992 | Giza . |
| 5,407,341 | 4/1995 | Endo et al. . |
| 5,439,371 | 8/1995 | Sawaya ................................... 425/556 |
| 5,458,473 | 10/1995 | Banji . |

*Primary Examiner*—Tim Heitbrink
*Attorney, Agent, or Firm*—Donald R. Bahr; Laubscher & Laubscher

[57] ABSTRACT

An improved golf ball injection mold is characterized by upper and lower support plates each containing corresponding hemispherical cavities which define spherical mold cavities when the plates are brought together. A plurality of retractable core pins are arranged in each cavity for supporting a core of a golf ball. A runner within the plates delivers fluid thermoplastic material to each cavity to form a cover on the golf ball core supported therein, and a cooling channel is provided adjacent to each cavity to provide even cooling of the thermoplastic material. Independently operated ejection assemblies are provided for the golf ball and for the residual thermoplastic material in the runner. With the improved ejection mold, the size and roundness of the golf ball and the surface configuration of the golf ball cover are more consistent and the molding time is reduced.

10 Claims, 5 Drawing Sheets

GOLF BALL INJECTION MOLD

BACKGROUND OF THE INVENTION

In the golf ball manufacturing process, it is common practice to form the cover of the ball using injection molding. A mold comprising a pair of parallel plates containing opposed hemispherical cavities is used to form a spherical cavity within which a golf ball core is suspended by retractable pins. Thermoplastic material is supplied to the cavity via a runner and a plurality of gates within the mold. The runner is provided around the parting line defined where the hemispherical cavities terminates at the surface of the molding plates and the gates connect the runner with the cavities. After the thermoplastic material sets, the plates are separated and the golf ball is removed from the cavity. Unfortunately, the ball has a flash line about its equator and gate vestiges along the flash line corresponding with the gates used to supply thermoplastic material to the cavity. Accordingly, the ball must be trimmed or ground to remove these imperfections.

The present invention relates to an improved mold for simultaneously injection molding a plurality of golf balls which have improved surface characteristics and minimal imperfections.

BRIEF DESCRIPTION OF THE PRIOR ART

Injection molds for forming golf balls are well-known in the patented prior art. The Lavallee et al U.S. Pat. No. 5,122,046, for example, discloses a retractable pin golf ball injection mold wherein the parting line clearance is reduced to substantially zero to eliminate the flash line in the golf ball surface. Moreover, the tunnel gates are offset from the parting line so that the gate vestiges break away from the ball surface when the ball is removed from the mold. The Giza U.S. Pat. Nos. 4,959,000 and 5,147,657 disclose retractable pin molds for golf balls where the gate valves are at the poles.

While the prior devices operate satisfactorily, they still possess inherent drawbacks which lead to imperfections in the golf ball surface and which limit the production capacity owing to the time required in the molding process. The thermoplastic material which is used to form the golf ball cover is normally heated to a fluid state so that it will flow through the runner, under pressure, to the cavity. When the cavity is full, a period of time is required to allow the thermoplastic material to set or harden. As the material sets, it shrinks slightly, thereby drawing additional material from the gates. When the ball is ejected from the cavity by operation of the lower retractable pins, this additional material from the gates still results in gate vestiges on the surface of the ball as well as residual material in the runner.

The present invention was developed in order to overcome these and other drawbacks of the prior golf ball molds by providing a golf ball mold including a cooling circuit to decrease the setting time of the thermoplastic material and a two-stage ejector mechanism to independently eject excess thermoplastic material from the runner and the golf ball from the mold cavity.

SUMMARY OF THE INVENTION

Accordingly, it is a primary object of the present invention to provide an injection mold for simultaneously molding the cover onto a plurality of golf balls. The mold includes upper and lower support plates each of which contain a plurality of hemispherical cavities which are adapted to mate to define a plurality of spherical cavities when the plates are brought together. Retractable core pins are arranged in each of the cavities to support a core of a golf ball. The axes of the pins are substantially perpendicular to the parting lines defined where the cavities terminate at the surface of the plates. A runner is arranged in the plates and extends about the parting line of each cavity to supply fluid thermoplastic material to the cavities to form the cover on the golf ball core. Each plate also includes a coolant channel arranged adjacent to each of said hemispherical cavities. Coolant flow within the channels cools the thermoplastic material of each golf ball cover to reduce the setting time. Independently operable ejection assemblies are provided in the lower plate for sequentially ejecting the excess thermoplastic material from the runner and the golf ball from the cavity.

According to a more specific object of invention, the runner includes a circuit of feeder lines in the plates and a pair of concentric rings for each of the hemispherical cavities. Gates between the outer and inner rings and between the inner ring and the cavity afford a uniform distribution of thermoplastic material within each spherical cavity about the golf ball core.

According to another object of the invention, a control device is provided to control the operation of first and second ejection assemblies for the golf ball and runner material, respectively. More particularly, the first ejection assembly includes a first piston and the retractable core pins of the lower plate which are displaced with respect to the cavities by the piston. The second ejection assembly includes a plurality of knock-out pins and a second piston which displaces the knock-out pins with respect to the runners.

The control device includes a timer for controlling the sequential operation of the first and second pistons at selected intervals, whereby the excess thermoplastic material is first ejected from the runner and the golf balls are then ejected from their respective cavities.

BRIEF DESCRIPTION OF THE FIGURES

Other objections and advantages of the invention will become apparent from a study of the following specification when viewed in the light of the accompanying drawing, in which.

DETAILED DESCRIPTION

Figure 1:
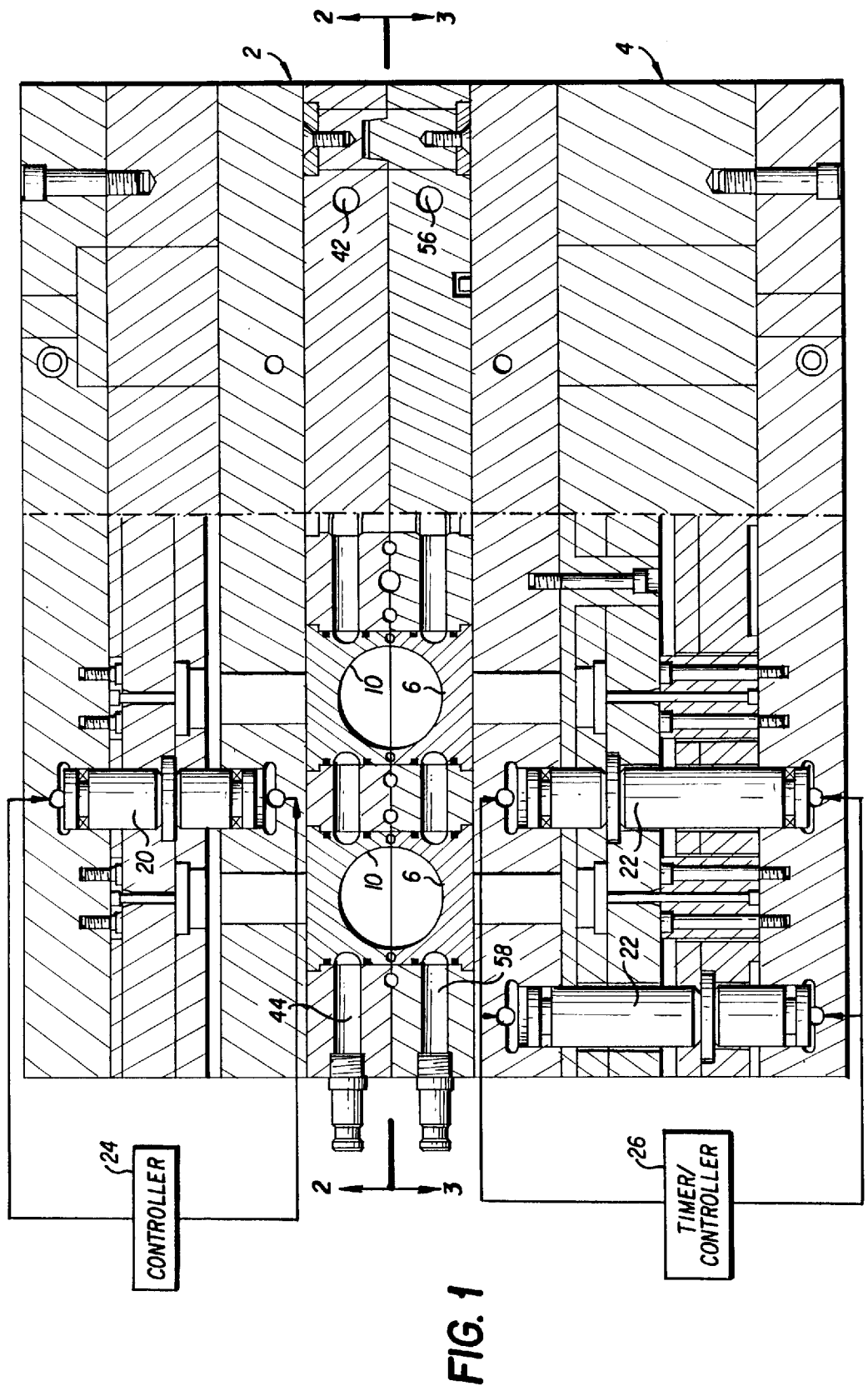
FIG. 1 is a front sectional view of the golf ball injection mold according to the invention.
Figure 2:
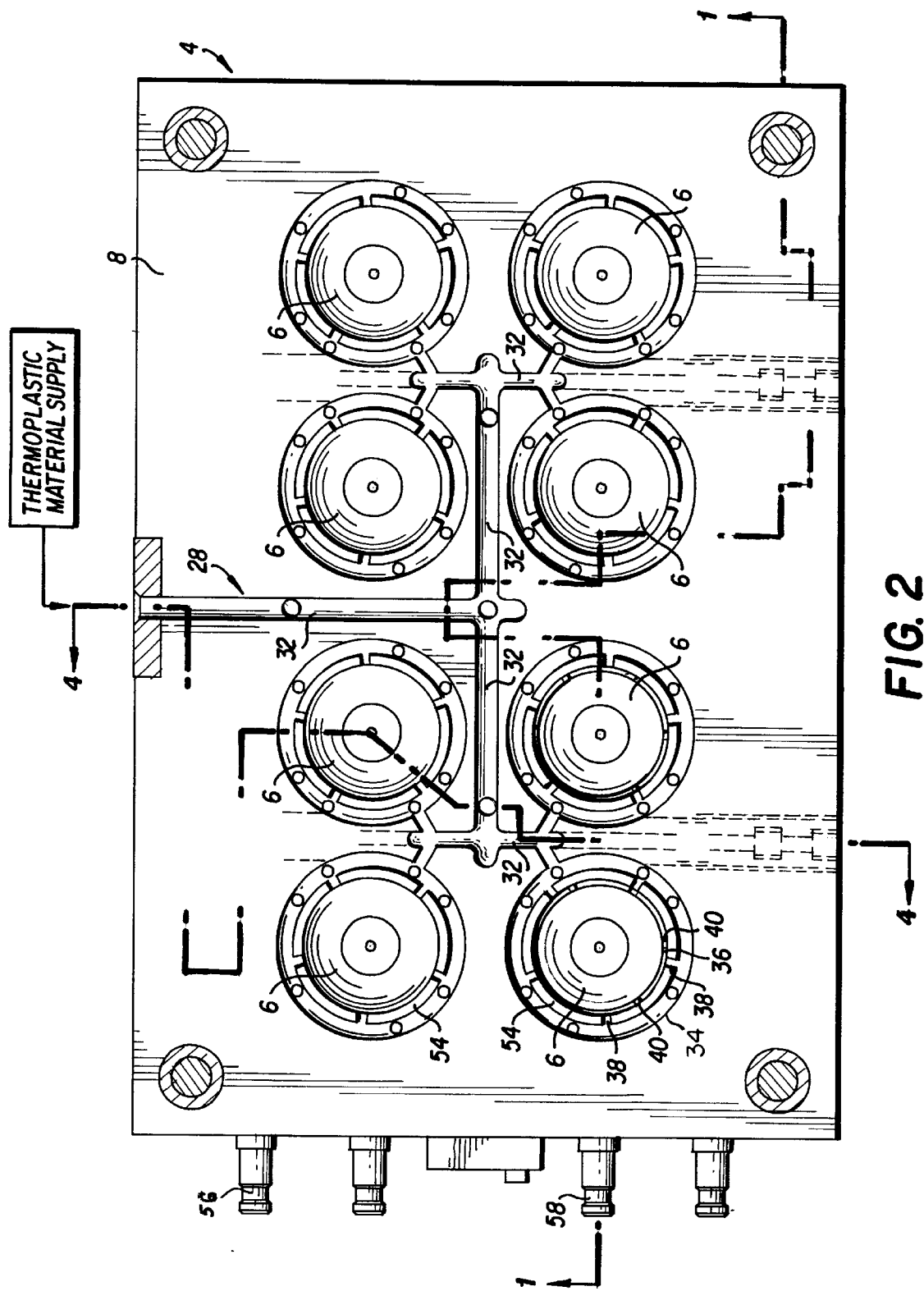
FIG. 2 is a top plan view of the bottom mold plate of FIG. 1.
Figure 3:
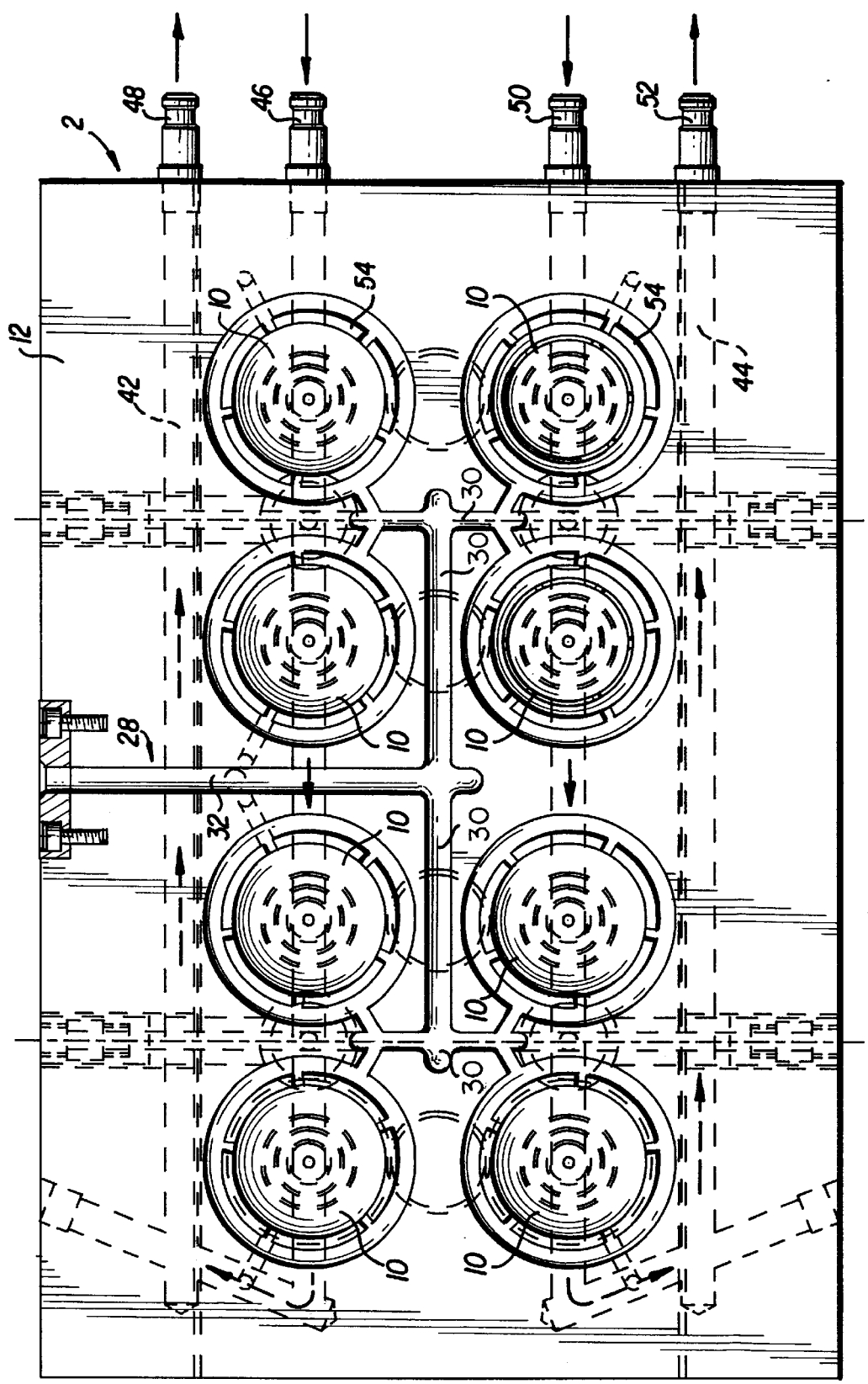
FIG. 3 is a bottom plan view of the top mold plate of FIG. 1.

Referring initially to FIGS. 1–3, the golf ball injection mold according to the invention will be described. The mold includes upper 2 and lower 4 plates which can be displaced relative to one another in a conventional manner between the contiguous position shown in FIG. 1 and a spaced position. The lower plate 4 includes a plurality of spaced hemispherical cavities 6 in the upper surface 8 thereof as shown in FIG. 2 while the upper plate 2 includes corresponding hemispherical cavities 10 in the lower surface 12 thereof as shown in FIG. 3. A parting line is defined where each hemispherical cavity terminates with the corresponding surface. When the plates are brought together in contiguous relation, the respective upper and lower hemispherical cavities cooperate to define a plurality of spherical cavities, one for each golf ball being formed. In the example illustrated in the drawing, eight cavities are defined. However, it will be appreciated that any convenient number of cavities may be provided to simultaneously cover that number of golf balls.

Figure 5:
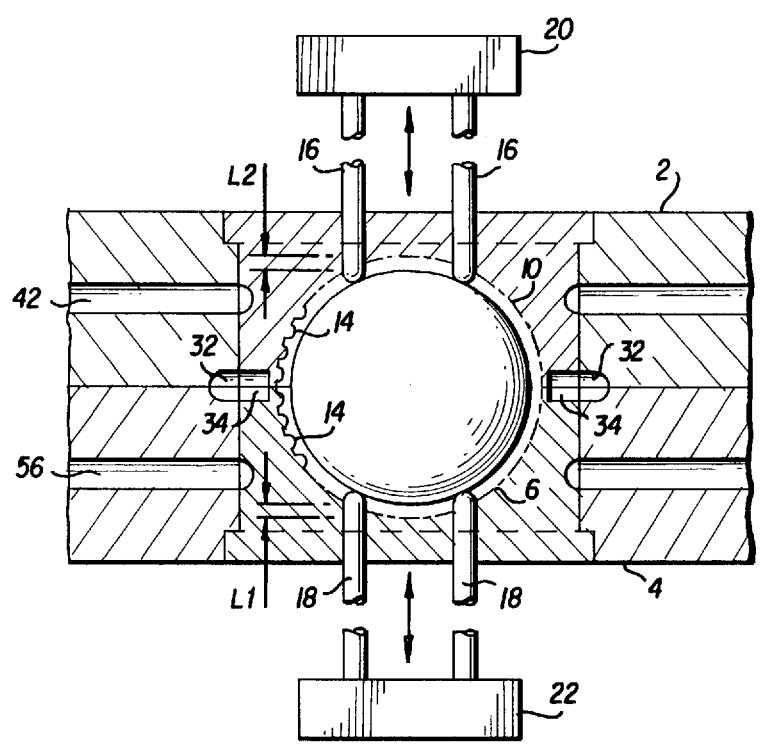
FIG. 5 is a detailed sectional view of a spherical cavity of the injection mold of FIG. 1 with a golf ball arranged therein.

As shown in FIG. 5, each hemispherical cavity includes a patterned surface 14 which will define a dimple pattern in the outer surface of the golf ball pattern. The upper hemispherical cavities 10 also include a plurality of retractable core pins 16 and the lower hemispherical cavities include a plurality of retractable core pins 18. The pins have axes perpendicular to the parting lines of the respective plates and are extensible into the spherical cavity to support a golf ball core during the injection molding process. The upper retractable core pins 16 are connected with a piston 20 and the lower plate pins 18 are connected with a piston 22. The operation of the upper piston 20 is controlled by a controller 24 and the operation of the lower piston 22 is controlled by a controller 26 as shown in FIG. 1.

In order to supply thermoplastic material to each cavity, a runner is provided in the upper and lower plates. The runner 28 comprises a network of feeder lines 30, 32 in the upper and lower plate surfaces 12, 8 respectively, which define flow channels when the plates are in contiguous relation. Surrounding each hemispherical cavity are a pair of concentric runner rings 34, 36 which for clarity are only shown in the lower left hemispherical cavities of FIG. 2. The outer runner ring 34 is connected with the feeder passage 32. The inner runner ring 36 is connected with the outer runner ring 34 via a plurality of first tunnel gates 38 and with the cavity 6 via plurality of second tunnel gates 40.

The arrangement of concentric runner rings for each cavity provides a uniformly balanced flow of thermoplastic material to each gate. More particularly, with a golf ball core supported in each spherical cavity by the core pins and the plates brought together, heated fluid thermoplastic material is delivered to the runner 28 under pressure. The material flows through the feeder lines to the concentric runner rings 34, 36. The outer runner ring 34 preferably has a greater diameter than the inner runner ring 36, i.e., 0.250 inch versus 0.125 inch. Once the outer ring 34 is filled and pressurized, thermoplastic material begins to flow through the first tunnel gates 38 into the inner runner ring 36. Once the inner runner ring is filled and pressurized, thermoplastic material will flow through the gates 40 into the mold cavity. The concentric runner ring arrangement insures a uniform flow of material into all of the gates simultaneously, thus preventing flooding of the gates located closest to the feeder line. Equal and even filling of the gates is critical to insuring a uniform distribution of material about the golf ball core.

In order to decrease the time required for cooling and setting of the thermoplastic material on the golf ball cores, a coolant such as water is supplied adjacent to each hemispherical cavity. More particularly, each mold plate includes a pair of coolant channels. The upper plate includes channels 42, 44, each of which is designed to cool four hemispherical cavities. The coolant channel 42 for the four rear cavities includes an inlet 46 and an outlet 48 and the coolant channel 44 for the four forward cavities includes an inlet 50 and an outlet 52. From the inlets, the fluid channels 42, 44, go directly to the cavities. Each channel includes an annular groove 54 in the mold cavity which puts the coolant in direct contact with the mold cavities.

The lower mold plate includes channels 56, 58 which are the same as channels 42, 44 in the upper plate in that they also include an inlet and an outlet and an annular groove in the mold cavity.

The direct contact of coolant with the upper and lower hemispherical cavities provides uniform cavity cooling at the poles (at the bottom of the cavities) as well as at the equator (at the parting line) of the golf ball resulting in the ability to closely control the size and roundness of the golf ball. This is because any shrinkage of the ball cover as the thermoplastic material hardens is more uniform. The cavity parting line clearance is not allowed to exceed 0.0002 inch and is preferably held to zero clearance in order to minimize the clamping force required to keep the tool closed during injection and to prevent flashing at the parting line while aiding in maintaining consistent size and roundness to the ball.

After the golf ball cover material has hardened, the plates are separated and the golf balls are ejected from the cavities. To this end, the lower plate retractable core pins 18 are displaced into the respective cavities a distance corresponding to the cover thickness L1 to eject the balls from the cavities. Movement of the pins 18 is controlled by the controller 26 which operates the pistons 22 to displace the pins 18.

The golf ball cover is generally quite thin, typically less than one hundred thousandths of an inch. The retractable core pins thus cannot travel a distance adequate to eject both the golf ball and the residual thermoplastic material in the runner. In order to eject the runner material, a separate ejector system is provided.

Figure 4:
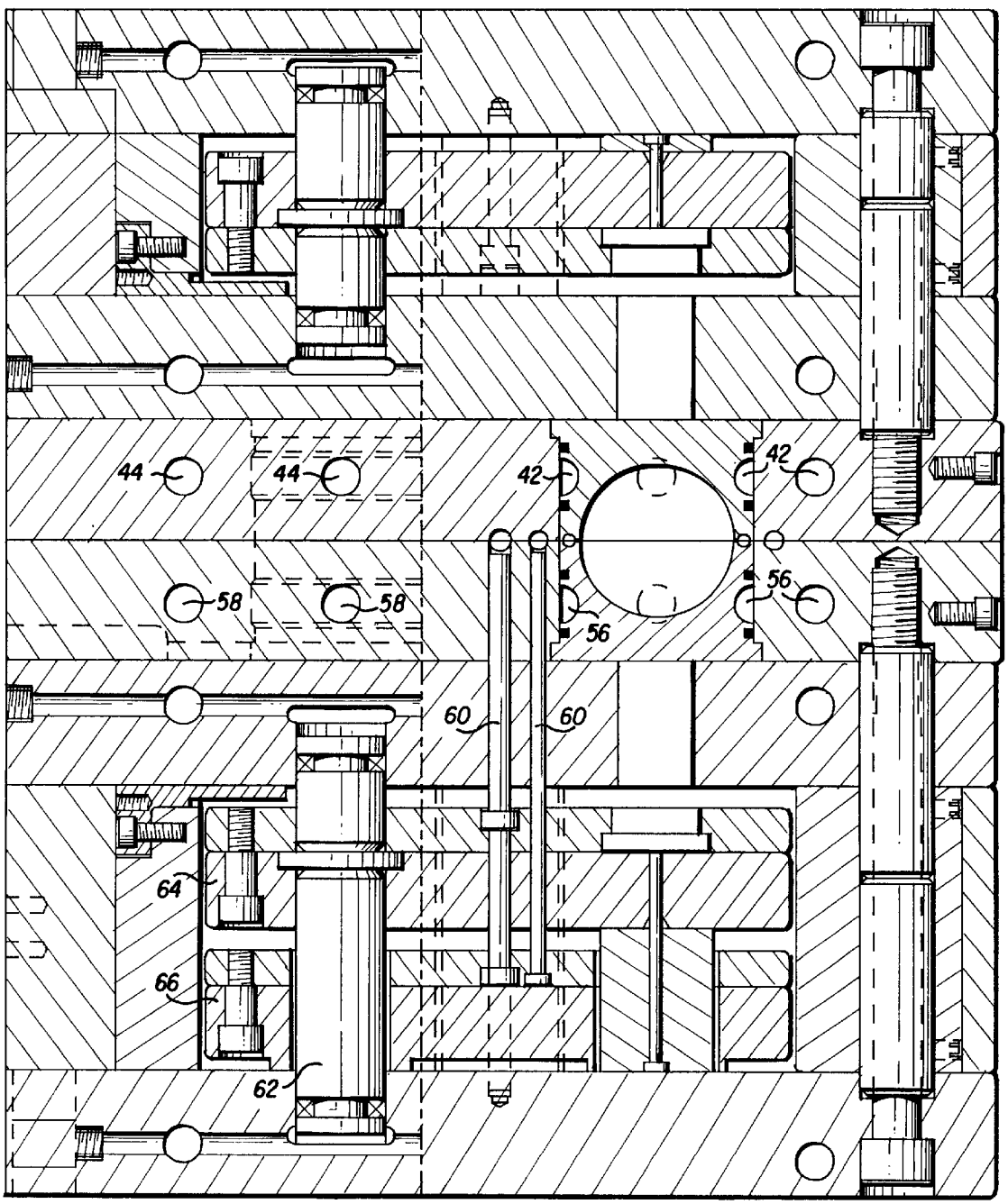
FIG. 4 is a sectional view of the injection mold taken along line 4—4 of FIG. 2.

Referring to FIGS. 1 and 4, the separate ejector system for the runner material includes a plurality of reciprocating knock-out pins 60 arranged beneath the runner. A piston 62 is operated to displace the knock-out pins. Operation of the piston is controlled by the controller 26. The same controller 26 may be used to operate the runner ejector piston 62 and the core pin piston 22 at selected intervals set by a timer. Alternatively, separate controllers may be provided for the pistons 22 and 62. What is important is that the ball ejection pistons and the runner ejection pistons be independently operable so that a desired sequence of ejection and the length of travel of the pistons and their respective pins can be controlled. The ability to raise the runner knock-out pins 60 further than the core pins greatly enhances the ability of automated pick and place equipment to remove molded golf balls from the mold with less cool down time since the longer travel knock-out action is less sensitive to runner remnant stiffness to be effective.

It will be appreciated that a number of groups of core pins, one group for each cavity, can be simultaneously displaced by one or more pistons 22. Accordingly, a first knock-out bar 64 (FIG. 4) is provided to interconnect the pistons 22 with the groups of core pins. Similarly, a second knock-out bar 66 is provided to connect the runner ejector piston or pistons 62 with a plurality of groups of knock-out pins 60.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An injection mold for applying a cover layer to golf balls, comprising (a) upper and lower support plates each containing at least one hemispherical cavity, said upper and lower hemispherical cavities being adapted to mate to define at least one spherical cavity when said plates are brought together;

(b) a plurality of retractable core pins in each of said cavities for supporting a core of a golf ball within said spherical cavity, the longitudinal axis of said pins being substantially perpendicular to parting lines defined where said cavities terminate at a surface of said plates;

(c) runner means arranged in said plates and extending about said parting line of each cavity for supplying fluid thermoplastic material to said cavities to form a cover on the golf ball core;

(d) cooling means arranged adjacent to each of said hemispherical cavities for cooling the thermoplastic material of each golf ball cover; and (e) means for independently sequentially ejecting excess thermoplastic material from said runner means and the golf ball from said cavities after said thermoplastic material has set.

2. An injection mold for applying a cover layer to golf balls, comprising (a) upper and lower support plates each containing at least one hemispherical cavity, said upper and lower hemispherical cavities being adapted to mate to define at least one spherical cavity when said plates are brought together;

(b) a plurality of retractable core pins in each of said cavities for supporting a core of a golf ball within said spherical cavity, the longitudinal axis of said pins being substantially perpendicular to parting lines defined where said cavities terminate at a surface of said plates;

(c) runner means for supplying a uniform balanced flow of thermoplastic material to said cavities to form a cover on the golf ball core, said runner means comprising a circuit of feeder lines in said plates and concentric rings for each of said hemispherical cavities;

(d) cooling means arranged adjacent to each of said hemispherical cavities for cooling the thermoplastic material of each golf ball cover; and (e) means for independently ejecting excess thermoplastic material from said runner means and the golf ball from said cavities after said thermoplastic material has set.

3. An injection mold as defined in claim 2, wherein said cooling means comprises at least one cooling channel in each plate adjacent to said hemispherical cavities through which coolant flows to directly cool each of said cavities.

4. An injection mold as defined in claim 3, wherein said cooling channel includes an annular portion surrounding each of said cavities, whereby the poles and the equator of the golf ball are evenly cooled.

5. An injection mold as defined in claim 2, wherein said ejecting means is arranged in said lower plate.

6. An injection mold as defined in claim 5, wherein said ejecting means comprises (a) a first ejection assembly for ejecting the golf balls from their associated cavities, respectively;

(b) a second ejection assembly for ejecting residual thermoplastic material from said runner means; and (c) control means for independently controlling the operation of said first and second ejection assemblies.

7. An injection mold as defined in claim 6, wherein said first ejection assembly comprises said retractable core pins arranged in said lower cavities and first piston means for displacing said core pins with respect to said cavities.

8. An injection mold as defined in claim 7, wherein said second ejection assembly comprises a plurality of reciprocating knock-out pins arranged beneath said runner means generally perpendicular to said parting line surface and second piston means for displacing said knock-out pins with respect to said runner means.

9. An injection mold as defined in claim 8, wherein said control means includes a timer for controlling the sequential operation of said first and second pistons at selected intervals.

10. An injection mold as defined in claim 9, wherein the displacement of said first and second ejection assemblies is adjustable.

* * * * *